US012811302B2

(12) United States Patent
Tian et al.

(10) Patent No.: US 12,811,302 B2
(45) Date of Patent: Nov. 24, 2026

(54) RADIOFREQUENCY COMMUNICATION ARRANGEMENT

(71) Applicant: SIGNIFY HOLDING B.V., Eindhoven (NL)

(72) Inventors: Chaonan Tian, Shanghai (CN); Shanshan Qu, Shanghai (CN); Yue He, Shanghai (CN); Ruipan Zhang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 96 days.

(21) Appl. No.: 19/099,834

(22) PCT Filed: Jul. 18, 2023

(86) PCT No.: PCT/EP2023/069953
§ 371 (c)(1),
(2) Date: Jan. 30, 2025

(87) PCT Pub. No.: WO2024/028107
PCT Pub. Date: Feb. 8, 2024

(65) Prior Publication Data

US 2026/0039023 A1 Feb. 5, 2026

(30) Foreign Application Priority Data

Aug. 1, 2022 (WO) ................ PCT/CN2022/109536
Aug. 29, 2022 (EP) .................................... 22192535

(51) Int. Cl.
*H01Q 1/02* (2006.01)
*F21V 23/04* (2006.01)
(Continued)

(52) U.S. Cl.
CPC ......... *H01Q 13/12* (2013.01); *F21V 23/0435* (2013.01); *F21V 29/70* (2015.01); *H01Q 1/02* (2013.01)

(58) Field of Classification Search
CPC .. H01Q 1/02; H01Q 1/22; H01Q 1/44; H01Q 13/10; H01Q 13/12; F21V 23/04;
(Continued)

(56) References Cited

U.S. PATENT DOCUMENTS 6,628,237 B1 * 9/2003 Forster .................. H01Q 13/10 343/746
8,519,900 B2 * 8/2013 Chen .................... H01Q 9/0428 343/767
(Continued)

FOREIGN PATENT DOCUMENTS

JP 2001156533 A 6/2001

*Primary Examiner* — Tho G Phan

(57) ABSTRACT

A radiofrequency communication arrangement in which a radiofrequency communication board is directly coupled to a metal plate containing a slot antenna. A pair of first radiofrequency connection portions. coupled to the radiofrequency communication board. connects to a pair of second radiofrequency connection portions coupled to the slot antenna. The second radiofrequency connection portion is integrally with a main body of the metal plate and positioned at opposing sides of and connected with the slot antenna. the second radiofrequency connection portion being configured to mechanically engage and position and electrically connect to the first radiofrequency connection portion to thereby mechanically engage to the radiofrequency communication board and electrically connect the slot antenna to the radiofrequency communication circuit. one of the first and the second radiofrequency connection portions comprises a projected structure and the other one of the first and the second radiofrequency connection portions comprises a hook struc-
(Continued)

ture adapted to clamp the projected structure between the hook structure and the other one of the first and the second

10 Claims, 4 Drawing Sheets

(51) Int. Cl.
*F21V 29/70* (2015.01)
*H01Q 13/12* (2006.01)

(58) Field of Classification Search
CPC ...... F21V 23/0435; F21V 29/70; F21V 29/71; F21K 9/23; F21K 9/235; F21K 9/237
See application file for complete search history.

(56) References Cited

U.S. PATENT DOCUMENTS

| | | | | |
|---|---|---|---|---|
| 10,431,869 | B2 * | 10/2019 | Samardzija ............ | H01Q 1/002 |
| 11,563,274 | B2 * | 1/2023 | Samardzija .............. | H01Q 1/22 |
| 12,476,357 | B2 * | 11/2025 | Tamrakar ............. | H01Q 1/2266 |
| 12,555,890 | B2 * | 2/2026 | Lukic ....................... | H01Q 1/22 |
| 2001/0052877 | A1 | 12/2001 | Honda et al. | |
| 2011/0043413 | A1 | 2/2011 | Zadesky et al. | |
| 2016/0072176 | A1 | 3/2016 | Van Dijk et al. | |
| 2017/0374724 | A1 | 12/2017 | Liszt | |
| 2019/0020224 | A1 | 1/2019 | Hosseini | |
| 2020/0015340 | A1 | 1/2020 | Louh et al. | |
| 2020/0214114 | A1 | 7/2020 | Wu et al. | |
| 2020/0284400 | A1 | 9/2020 | Wu et al. | |
| 2021/0091455 | A1 | 3/2021 | Liu et al. | |

* cited by examiner

RADIOFREQUENCY COMMUNICATION ARRANGEMENT

CROSS-REFERENCE TO PRIOR APPLICATIONS

This application is the U.S. National Phase application under 35 U.S.C. § 371 of International Application No. PCT/EP2023/069953, filed on Jul. 18, 2023, which claims the benefit of European Patent Application No. 22192535.7, filed on Aug. 29, 2022 and International Application No. PCT/CN2022/109536, filed on Aug. 1, 2022. These applications are hereby incorporated by reference herein.

FIELD OF THE INVENTION

The present invention relates to the field of radiofrequency communication equipment.

BACKGROUND OF THE INVENTION

There is a need for antennae in radiofrequency communication equipment for emitting and/or receiving radiofrequency waves.

One form of antenna is a slot antenna, which is formed by providing one or more slots or holes in a metal plate. The slot antenna is then electrically coupled to a radiofrequency communication circuit ("RF circuit") to allow said circuit to control the emission of radiofrequency waves and/or process data carried by received radiofrequency waves.

There is an ongoing desire to improve radiofrequency communication equipment having a slot antenna.

US2017/374724A1 discloses a LED lighting device with a slot antenna on the housing.

US20160072176A1 discloses a LED lighting device with a slot antenna formed by a slot on housing and a slot formed on a board aligned with each other.

US20190020224A1 discloses a slot antenna module with a cover cut with slot antennas and a PCB underneath and electrically connected to the cover.

US2021091455A1 discloses a metal shielding cover slot antenna.

US20010052877A1 discloses an orthogonal slot antenna assembly.

US20110043413A1 discloses a connector with a slot antenna formed on the housing of the connector.

SUMMARY OF THE INVENTION

Compared to integrated antenna modules in which the antenna and the RF circuit is put on the same PCB, a slot antenna is often formed on a separate substrate to the RF circuit board, thus there is a need to connect the slot antenna with the RF circuit.

US2017/374724 A1 proposes several solutions: using float jump wires to connect the RF circuit and the surface on the housing near the slot antenna, and using pogo pins on the RF circuit board to electrically connect to the planar surface of the housing near the slot antenna. The inventors have identified that existing approaches for electrically coupling a slot antenna to a radiofrequency communication circuit suffer from difficulty in assembly or manufacturing and low efficiency (e.g., due to interference). For instance, a wired connection between the slot antenna and the circuit is difficult to assemble, as it requires two separate elements to be held and soldered together. Using dedicated connectors such as pogo pins requires a large volume (i.e., increases the size of the overall system) thus is not applicable for small size applications, and the dedicated connectors also increases the cost. Existing approaches also suffer from inter-device variation, as it is difficult to consistently place a connection to a slot antenna in a same place for each of a plurality of devices.

The invention is defined by the claims.

The present disclosure proposes an approach to overcome at least some of these issues. A radiofrequency connection portion is integrally with but deformed from a main body of metal into which a slot antenna is formed. Another connection portion on the radiofrequency communication board engages mechanically and electrically with this connection portion on the metal. This approach provides a consistently positioned connection between the slot antenna and the circuit that is also electrically and mechanically robust for improved efficiency. Deforming the metal to form the radiofrequency connection portion mitigates the need to use a dedicated extra radiofrequency connector, reduces the signal loss, and reduces cost. Besides, the deformed connection portion can provide a reliable mechanical engagement/holding to the radiofrequency communication board. The proposed approaches also provide a mechanism for simultaneously providing structural support for the radiofrequency communication circuit. This overcomes problems and difficulties with manufacturing/assembling the radiofrequency communication arrangement, as well as avoiding the cost and complexity of providing a separate, dedicated support for the radiofrequency communication arrangement.

In the context of the present disclosure, it is viewed that any extra structure on the normal main body or other modification to the normal main body, except for the slot forming the slot antenna, can be regarded as "deforming" the main body thus falls into the scope of the second radiofrequency connection portion. By comparison, in US2017/374724 A1, the original planar surface of the housing which contacts the pogo pin is not an extra structure on the housing or a modification to the housing, thus it is excluded from the scope of the invention.

Thus, a first element is integrally with but deformed with respect to a second element if the first element is produced by deforming the second element, e.g., performing one or more of the following: cutting, stamping, bending and/or other steps affecting the shape of the second element.

According to examples in accordance with an aspect of the invention, there is provided a radiofrequency communication arrangement comprising: a radiofrequency communication board carrying a radiofrequency communication circuit and a pair of first radiofrequency connection portions connected with said radiofrequency communication circuit; and a metal plate.

The metal plate comprises: a main body of metal; a slot antenna formed in the main body; a pair of second radiofrequency connection portions integrally with the main body and positioned at opposing sides of the slot antenna and connected with the slot antenna, the second radiofrequency connection portion being configured to mechanically engage and position and electrically connect to a respective one of the first radiofrequency connection portions to thereby mechanically engage to the radiofrequency communication board and electrically connect the slot antenna to the radiofrequency communication circuit, wherein one of the first and the second radiofrequency connection portions comprises a projected structure and the other one of the first and the second radiofrequency connection portions comprises a hook structure adapted to clamp the projected structure between the hook structure and the other one of the first and the second radiofrequency connection portions.

In the solution of US2017/374724 A1 wherein pogo pins on the RF board connects to planar surfaces of the housing, the housing is planar and does not has a capability of positioning the pogo pins, and therefore the pogo pins have to apply a large elastic force to secure the connection. By comparison, in the present application, the deformed connection portion can provide robust mechanical positioning and connection, in turn robust radiofrequency connection, in an easier manner. The extra separate connector can also be saved and the size of the radiofrequency communication board as well as the whole apparatus can be reduced since it does not need to mount the extra connector.

In some examples, the second radiofrequency connection portion comprises the hook structure which is a protruding structure that protrudes from the main body to mechanically engage to the radiofrequency communication board. This approach provides a mechanism for providing good structural support for the radiofrequency communication board that does not rely upon a configuration of the radiofrequency communication board. This increases an ease of assembly and/or installation, e.g., to prevent or reduce the chances of the radiofrequency communication board unintentionally passing by the second radiofrequency connection portion during attempted assembly.

In some examples, the radiofrequency communication arrangement comprises a metal housing that houses the radiofrequency communication board; the metal plate forms part of the metal housing; and the protruding structure protrudes towards an interior of the metal housing. This approach provides a more compact structure for the radiofrequency communication arrangement by re-using the metal housing as the slot antenna.

In one embodiment, the protruding structure may comprise a stamped protruding structure. Since stamping is a low cost but reliable manufacturing process, this embodiment provides a radiofrequency communication arrangement that is simpler to manufacture with increased reliability and structural integrity.

In one embodiment, the protruding structure may be configured to, besides clamping the projected structure of the first radiofrequency connection portion, apply a spring or elastic force towards the main body of the metal plate and towards the radiofrequency communication board. This improves the reliability of the mechanical and in turn electrical connection between the first and second connection portions.

In some examples, the first radiofrequency connection portion comprises a projection as the projected structure, to thereby mechanically engage and electrically connect to the hook structure. This provides a stable and reliable mechanism for coupling the first and second radiofrequency connection portions together.

In one embodiment, the hook structure may be configured to clamp the projection between the hook structure and the main body of the metal plate. This increases the reliability of the coupling between the first and second radiofrequency connection portions.

In one embodiment, the radiofrequency communication board is adapted to be placed horizontally with respect to the metal plate and/or (if present) within the metal housing, the hook structure and the main body of the metal plate form an opening facing perpendicularly upward therebetween, and the projection may project substantially perpendicularly from the radiofrequency communication board, facing downward and fitting into the opening. This embodiment has an advantage of easy assembling.

In some examples, the radiofrequency communication board comprises two of said first radiofrequency connection portions; and the metal plate comprises two of said second radiofrequency connection portions, at opposite sides of the slot antenna, for connecting to a respective one of the two first radiofrequency connection portions.

In this way, the radiofrequency communication arrangement may comprise two pairs of connection portions, each pair comprising a first radiofrequency connection portions (each embodied as any herein described first radiofrequency connection portions) and a second radiofrequency connection portion (each integrally formed with the main body of the metal plate and embodied as any herein described first radiofrequency connection portions). Firstly, this embodiment provides a preferred way to connect the slot antenna to the RF circuit via two connections respective for positive and negative signal feeding. Secondly, since there are two secure mechanical connections, this improves a reliability and robustness of the mechanical and/or electrical connection, e.g., to provide increased redundancy.

In some examples, instead of using a protruding structure, the second radiofrequency connection portion can be a concave structure. Alternatively, the second radiofrequency connection portion could comprise a concave structure with respect to the main body, and the first radiofrequency connection portion can fit into the concave structure. More specifically, the second radiofrequency connection portion may comprise a through or blind aperture in the main body of the metal plate and a wall of the aperture as the projected structure; and the first radiofrequency connection portion comprises a hooking or clipping element as the hook structure configured to clamp the wall of the aperture to mechanically and electrically engage the radiofrequency communication circuit to the metal plate.

Even more, any deformation is applicable as long as it can position and hold the radiofrequency communication board. Thus, the second radiofrequency connection portion is not limited as the protruding structure and the concave structure.

In one embodiment, the radiofrequency communication board is adapted to be placed horizontally with respect to the metal plate, and the hooking or clipping element is arc-shape inserting in the aperture and an opening of the arc-shape is facing downward and clamping the wall of the aperture at the bottom of the aperture.

In some examples, the second radiofrequency connection portion is positioned at a location along the slot antenna and away from a first end of the slot antenna by around a quarter of the longitudinal length of the slot antenna. This position increases the efficiency and sensitivity of the slot antenna with respect to the radiofrequency communication circuit.

In some examples, the main body of the metal plate is a heat sink. This approach provides additional functionality for the metal plate, to further reduce the number of components for a device containing the radiofrequency communication arrangement, providing a yet more compact device.

There is also proposed a lighting arrangement comprising: any herein disclosed radiofrequency communication arrangement; and a lighting element configured to emit light, one or more characteristics of the emitted light being responsive to radiofrequency communications received by the radiofrequency communication arrangement via the slot antenna.

Where the main body of the metal plate is a heat sink, said heat sink is preferably thermally coupled to the lighting element. This approach integrates the heat sink for the lighting arrangement with the slot antenna for a radiofrequency communication arrangement. Simultaneously, the radiofrequency communication arrangement is directly coupled to the heat sink via radiofrequency connection portions. This approach for configuring a lighting arrangement provides a more compact lighting arrangement.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
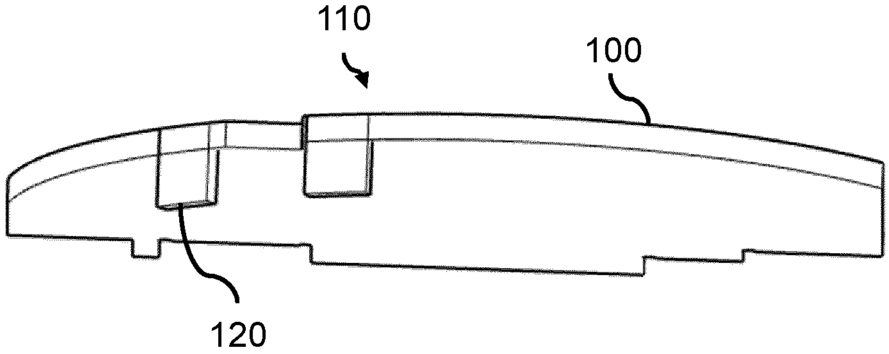
FIG. 1 illustrates a radiofrequency communication board for use in an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

There is proposed a radiofrequency communication arrangement in which a radiofrequency communication board is directly coupled to a metal plate containing a slot antenna. A first radiofrequency connection portion on the radiofrequency communication board connects to a second radiofrequency connection portion on the metal plate and coupled to the slot antenna. Most importantly, the second radiofrequency connection portion is an integral part of the metal plate but is deformed with respect thereto such that the deformed portion positions and holds the first radiofrequency connection portion, also providing a reliable electrical connection.

The proposed approach provides a direct electrical connection between the radiofrequency communication board and the metal plate that carries the slot antenna, thus the transmission loss is reduced and the efficiency is increased. The approach also provides mechanical support to the radiofrequency communication board. This means that the connection portions are able to perform at least two functions simultaneously, providing a more compact device.

FIG. 1 illustrates a radiofrequency communication board 100 for use in a proposed radiofrequency communication arrangement.

The radiofrequency communication board 100 carries a radiofrequency communication circuit 110 (not directly visible in FIG. 1) and a first radiofrequency connection portion 120.

The radiofrequency communication circuit 110 carries one or more radiofrequency communication components for performing a radiofrequency communication process. Example components will be apparent to the skilled person, and may include a radio frequency modem, processing circuitry such as baseband processor, controlling circuitry such as a microprocessor and interconnecting elements such as wires, resistors and so on. The first radiofrequency connection portion 120 is connected with the radiofrequency communication circuit. In particular, the first radiofrequency connection portion is electrically connected to the radiofrequency communication circuit and is configured such that, if itself supported or engaged with an external element, it is able to structurally support the radiofrequency communication arrangement.

The first radiofrequency connection portion 120 comprises or is formed of an electrically conductive material, such as a metal. In particular, the first radiofrequency connection portion 120 is configured to conduct or pass electrical signals to/from the radiofrequency communication circuit.

Figure 2:
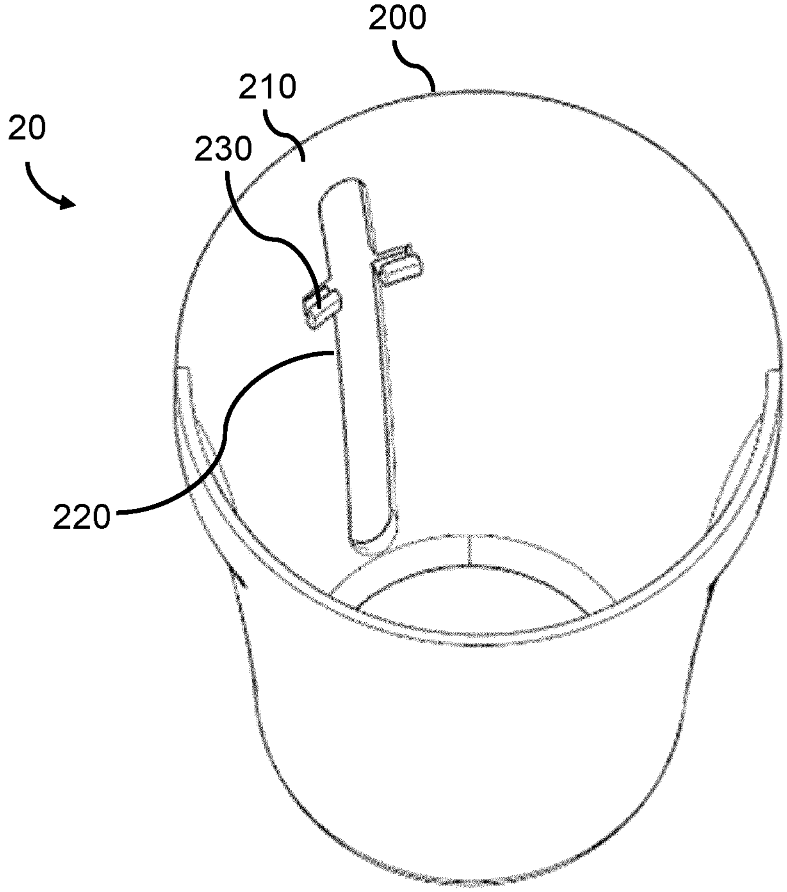
FIG. 2 illustrates a housing having a metal plate for use in an embodiment.

Additional reference is made to FIG. 2, which illustrates a metal plate 200 for use in the radiofrequency communication arrangement. The metal plate comprises a main body 210 of metal, a slot antenna 220 and a second radiofrequency connection portion 230. The second radiofrequency connection portion 230 is integrally formed with the main body 210 of the metal plate 200, but is deformed with respect to the main body 210.

Figure 4:
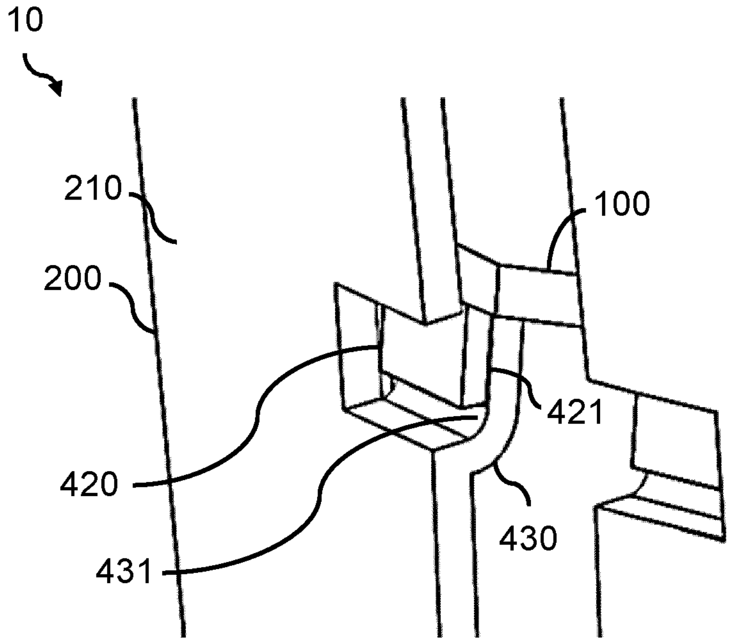
FIG. 4 illustrates a portion of the radiofrequency communication arrangement.

In the example shown in FIGS. 2 and 4, the "deform" is stamping a portion at the edge of the slot inwardly and forming an opening facing upward.

The second radiofrequency connection portion 230 is configured to perform a dual function, namely:

- mechanically positioning and engaging with and supporting the radiofrequency communication board and
- electrically connecting the slot antenna 220 to the radiofrequency communication circuit.

The second radiofrequency connection portion 230 is positioned adjacent to and connected with the slot antenna 220. Thus, electrical signals generated at the slot antenna (e.g., by incoming radiofrequency waves) will be conducted to the second radiofrequency connection portion 230. Similarly, appropriately configured electrical signals provided to the second radiofrequency connection portion 230 will result in the slot antenna 220 generating radiofrequency waves responsive to the provided electrical signals.

The second radiofrequency connection portion 230 is configured to mechanically engage and position with the first radiofrequency connection portion 120 (shown in FIG. 1) to thereby mechanically engage and position with and structurally support the radiofrequency communication board. In this way, when the first and second radiofrequency connection portions are engaged together, the radiofrequency communication board is mechanically secured to the main body 210 and thereby the metal plate 200. This is because the second radiofrequency connection portion 230 is integrally formed with the main body 210 of the metal plate 200.

Put another way, the first and second radiofrequency connection portions provide a structure for coupling the radiofrequency communication board 100 to the metal plate 200, whilst also providing an electrical path for (electrical) signals between the slot antenna 220 and the radiofrequency communication circuit 110.

To improve the proper wavelength, sensitivity and signal-to-noise ratio for signals received as a result of radiofrequency waves at the slot antenna 220, the second radiofrequency connection portion 230 can be positioned at a location along the slot antenna and away from a first end of the slot antenna by around a quarter of the longitudinal length of the slot antenna. At this position, an incoming radiofrequency wave will produce a signal having a greatest voltage (e.g., compared to any other position along the slot antenna).

In the illustrated example, the second radiofrequency connection portion 230 comprises a protruding structure that protrudes from the main body 200. The protruding structure may engage with the first radiofrequency connection portion by, for instance, allowing the first radiofrequency connection portion to rest on the protruding structure or to geometrically interlock with the protruding structure (e.g., be secured thereto).

The protruding structure comprises a stamped protruding structure, i.e., a protruding structure produced using a stamping procedure. This provides a radiofrequency communication arrangement that is easy and efficient to manufacture.

More detailed examples and embodiments for the first and second radiofrequency connection portions will be provided later in this disclosure.

The metal plate 200 may form part of a housing 20. Thus, there is provided a housing 20 that comprises the metal plate 200. The housing 200 may also be configured (e.g., appropriately sized and shaped) to house the radiofrequency communication board.

The illustrated housing 20 has a shape resembling a cylinder or a tapered cylinder. This provides a suitably strong structure for supporting at least the radiofrequency communication board.

In the illustrated example, the second radiofrequency connection portion 230 comprises a protruding structure that protrudes towards an interior of the housing 20, i.e., protrudes inwardly with respect to the housing.

Figure 3:
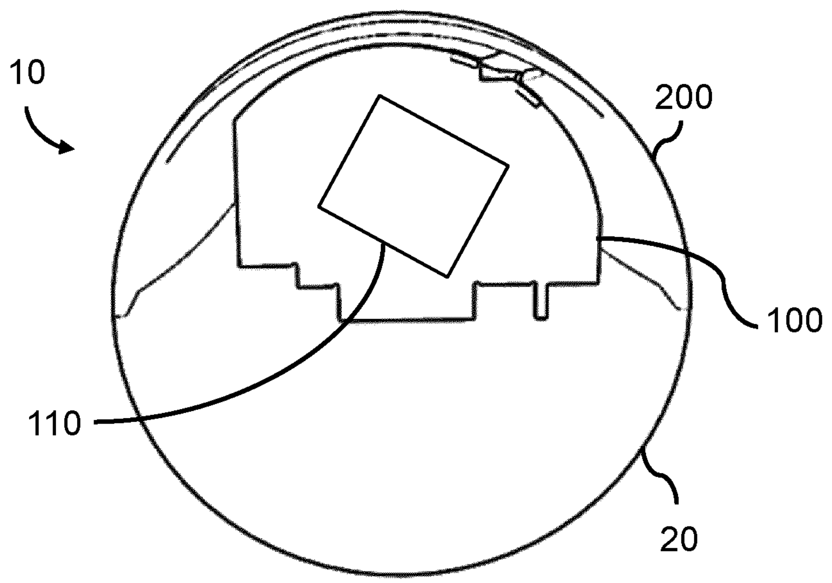
FIG. 3 illustrates a radiofrequency communication arrangement.

FIG. 3 provides a top-down view of a radiofrequency communication arrangement 10 comprising the radiofrequency communication board 100 and the metal plate 200 (which is here formed as part of a housing 20). This provides a clearer illustration of the radiofrequency communication circuit 110.

FIG. 4 illustrates a portion of a radiofrequency communication arrangement demonstrating one example approach for configuring the first and second radiofrequency connection portions. In this approach, the connection portions provide a hook-and-projection system for coupling the radiofrequency communication board 100 to the metal plate 200.

In this approach, the first radiofrequency connection portion 120 is/comprises a projection 420 that extends outwardly from the radiofrequency communication board 100. The second radiofrequency connection portion 230 is/comprises a hook 430 that is configured to mechanically engage with and electrically connect to the projection 420 that forms or provides the first radiofrequency connection portion.

The hook 430 is configured to, when engaged with the projection 420, apply a biasing force, such as a spring or elastic force, towards the main body 210 of the metal plate 200 and towards the radiofrequency communication board. In this way, the hook 430 can effectively clamp the projection 420 between the hook 430 and the main body 210 of the metal plate 200. Since the main body is metal, the hook 430 may be somewhat flexible with respect to the main body and this spring force can be provided.

The proposed approach provides a mechanism wherein the first radiofrequency connection portion 120 can be simply slotted into the second radiofrequency connection portion 230 to engage therewith. This provides a mechanically robust radiofrequency communication arrangement with ease of manufacturing and/or assembling.

A first surface 421 of the first radiofrequency connection portion 420 is coupled to or against a second surface 431 of the second radiofrequency connection portion 430. The surfaces provide mechanical support and electrical connectivity between the two portions.

The projection 420 may, for instance, project substantially perpendicularly from the radiofrequency communication board and face downward. The hook 430 and the main body may form an opening facing upward to receive the projection 420. This increases an ease of assembly of the radiofrequency communication board 110 within the radiofrequency communication arrangement. The projection 420 may, for instance, be created by soldering or otherwise securing the projection to the radiofrequency communication circuit 110.

Experimental analysis has identified that, for a radiofrequency communication arrangement configured as illustrated in FIG. 4, the radiation efficiency is greater than 0.990 (example experiments have identified an efficiency of 0.993).

Figure 5:
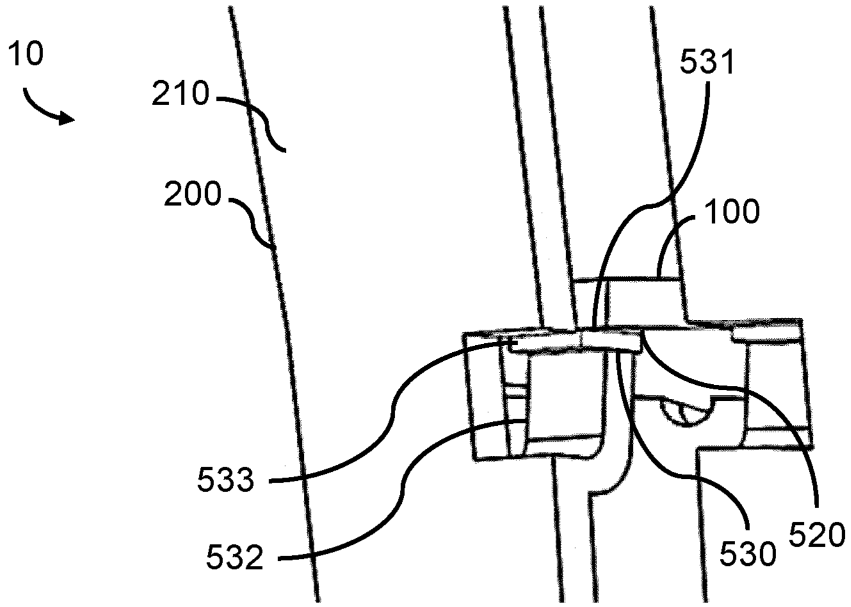
FIG. 5 illustrates a portion of another radiofrequency communication arrangement.
Figure 6:
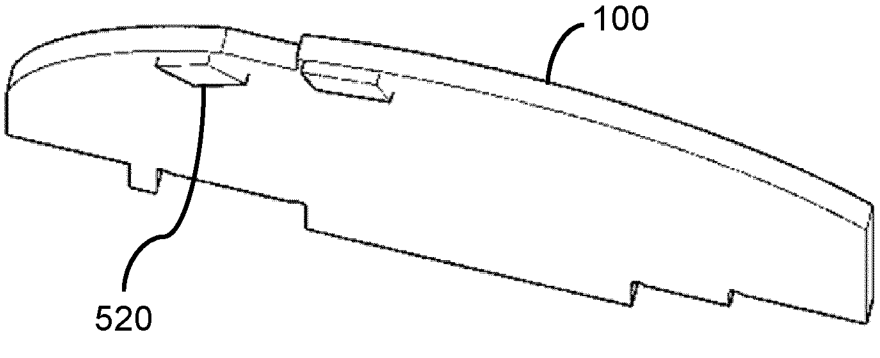
FIG. 6 illustrates a radiofrequency communication board for use with the other radiofrequency communication arrangement.

FIGS. 5 and 6 illustrate a portion of a radiofrequency communication arrangement 10 demonstrating another example approach for configuring the first and second radiofrequency connection portions. In this approach, the connection portions provide a rest-and-support system for coupling the radiofrequency communication board 100 to the metal plate 200.

As shown in FIG. 6, in this approach, the first radiofrequency connection portion is/comprises a substantially flat contact area 520 on the radiofrequency communication board. The flat contact area 520 can be considered to be a pad connected to the radiofrequency communication board. The second radiofrequency connection portion is/comprises a supportive protruding structure 530 for supporting the flat contact area 120. Thus, the flat contact area is configured to rest on the protruding structure to thereby mechanically position and engage and electrically connect to the protruding structure.

In this way, the radiofrequency communication board 100 effectively rests upon the supportive protruding structure 530 forming the radiofrequency communication portion.

The supportive protruding structure 530 may, for instance, comprise a complimentary flat surface area 531 against which the flat surface area 520 for the first radiofrequency connection portion rests. In particular, the supportive protruding structure 530 may comprise a first protruding portion 532 that protrudes from the main body 210 of the metal plate 200. The first protruding portion 532 may connect to a second protruding portion 533 that provides the complimentary flat surface area 531 against which the flat surface area 520 for the first radiofrequency connection portion rests.

To improve the connection between the first and second radiofrequency portions, preferably, the supportive protruding structure 530 is configured, when the flat surface area 520 of the radiofrequency communication board rests thereon, to provide a biasing force, such as a spring or elastic force, against the radiofrequency communication board. This improves the connection between the two portions, and thereby the signal quality of any signal passing between the two connection portions. Since the main body is metal, the protruding portion 532 may be somewhat flexible with respect to the main body and this spring force can be provided.

FIG. 6 illustrates a radiofrequency communication board 100 for use with a radiofrequency communication arrangement having connection portions that provide a rest-and-support system, as described with reference to FIG. 5.

FIG. 6 more clearly illustrates how the first radiofrequency connection portion may be/comprise a flat contact area 520 or pad, for resting against a protrusion forming a second radiofrequency connection portion.

Experimental analysis has identified that, for a radiofrequency communication arrangement configured as illustrated in FIGS. 5 and 6, the radiation efficiency is also greater than 0.990 (example experiments have identified an efficiency of 0.994).

Figure 7:
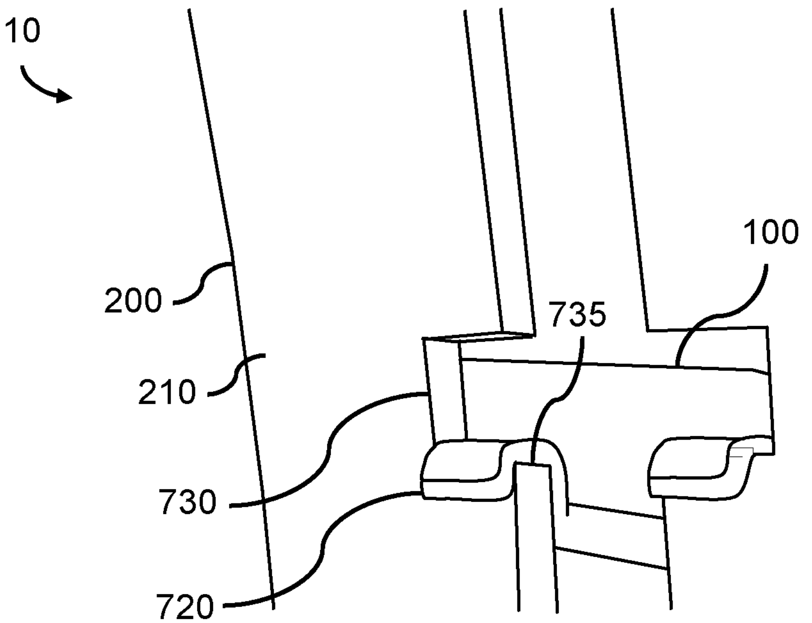
FIG. 7 illustrates a portion of yet another radiofrequency communication arrangement.

In the embodiments illustrated by the preceding Figures, the second radiofrequency connection portion comprises a protruding structure that engages with the first radiofrequency connection portion. But the scope of the claims should not be limited as such. FIG. 7 illustrates a portion of another radiofrequency communication arrangement 10 that demonstrates an alternative approach for configuring the first and second radiofrequency connection portions.

In this example, the second radiofrequency connection portion is/comprises an aperture 730 in the main body 210 of the metal plate 200. In this example, the aperture 730 is formed by cutting a portion away from the main body 210. The applicant opinions that this is also one kind of "deformed from the main body", as it is a result of a modification to the main body to provide the second radiofrequency connection portion. Correspondingly, the first radiofrequency connection portion comprises a hooking or clipping element 720. The hooking or clipping element 720 is configured to engage with the aperture 730 to mechanically and electrically engage the radiofrequency communication circuit to the metal plate.

Here, the hooking or clipping element 720 comprises a hook configured to hook over or engage with the aperture. Thus, the hooking or clipping element and the aperture are sized/configured such that the hooking/clipping element is configured to fit in an over a surface 735 defining at least part of the bounds of the aperture.

In this way, the radiofrequency communication board 100 may hang from an aperture in the main body 210 of the metal plate 200.

This approach provides an alternative approach for coupling the radiofrequency communication board to the main body, adopting similar principles as previously described.

Any above-described radiofrequency communication arrangement may be configured to comprise a plurality of first radiofrequency connection portions and a corresponding plurality of second radiofrequency connection portions. In such examples, there are at least as many first radiofrequency connection portions as second radiofrequency connection portions or vice versa.

Put another way, any above-described radiofrequency communication arrangement may comprise more than one pair of first and second radiofrequency connection portions. Each pair of first and second radiofrequency connection portions may be embodied as previously described.

In all illustrated examples, the radiofrequency communication board comprises two first radiofrequency connection portions; and the metal plate comprises two of second radiofrequency connection portions. The second radiofrequency connection portions are positioned at opposite sides of the slot antenna, for connecting to a respective one of the two first radiofrequency connection portions. The two pairs of interconnections are respectively connected to positive and negative ports of the RF signal.

In particularly advantageous embodiments, the main body of the metal plate is a heat sink. In this way, the main body and/or metal plate can provide an additional function of dissipating heat (e.g., from another component).

In particular examples, there is provided a lighting arrangement comprising any herein described radiofrequency communication arrangement; and a lighting element configured to emit light. The lighting element may be thermally coupled to the main body of the metal plate, which acts as a heat sink for the lighting element.

Preferably, one or more characteristics of the emitted light are responsive to radiofrequency communications received by the radiofrequency communication arrangement via the slot antenna.

Thus, the lighting arrangement may, for instance, comprise a control unit configured to receive signals (e.g., from the radiofrequency communication circuit) that are themselves responsive to radiofrequency communications or waves received via the slot antenna. The control unit may be configured to control one or more light characteristics of light output by the lighting element responsive to radiofrequency communications received at the slot antenna (provided and/or processed via the connection portions and the radiofrequency communication circuit).

Approaches for controlling light characteristics of light output by a lighting element are well known in the art, and are not described for the sake of conciseness. Approaches for defining the control performed by a control unit using radiofrequency communications are also well-established.

Figure 8:
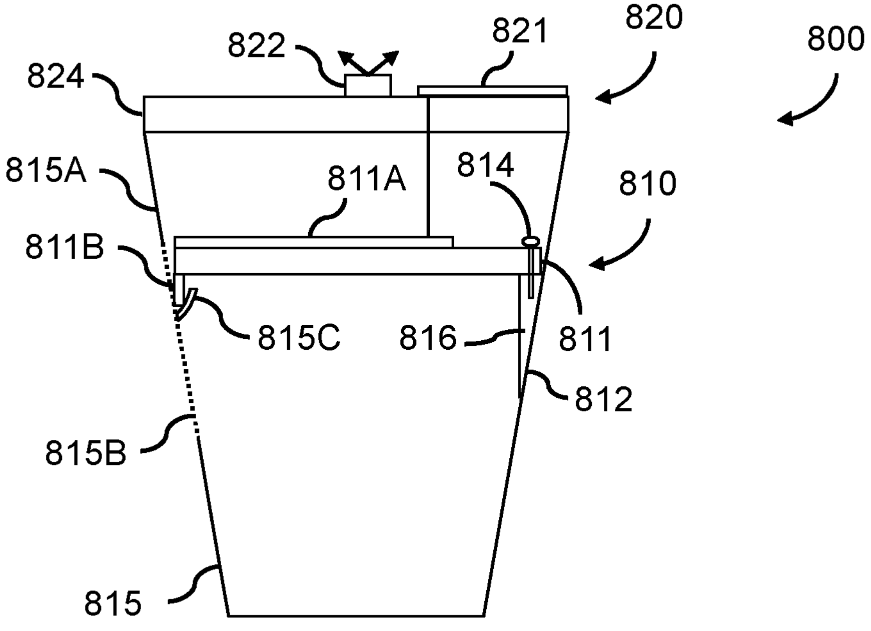
FIG. 8 illustrates a lighting arrangement comprising the radiofrequency communication arrangement in FIGS. 1 to 4.

FIG. 8 provides a cross-sectional view of an example lighting arrangement 800, comprising the radiofrequency communication arrangement as shown in FIGS. 1 to 4. The lighting arrangement 800 comprises a radiofrequency communication arrangement 810 and a lighting element 820.

The radiofrequency communication arrangement comprises a radiofrequency communication board 811 and a housing 812. The housing 812 houses the radiofrequency communication board 811 and comprises a metal plate 815.

The radiofrequency communication board 811 is embodied as previously described. Thus, it is a radiofrequency communication board 811 that carries a radiofrequency communication circuit 811A and a first radiofrequency connection portion 811B connected with said radiofrequency communication circuit.

The metal plate 815 is also embodied as previously described. Thus, the metal plate comprises a main body 815A of metal; a slot antenna 815B formed in the main body; and a second radiofrequency connection portion 815C. The location of the slot antenna is illustrated with a dotted line, for the sake of clarity. The second radiofrequency connection portion 815C engages and positions the first radiofrequency connection portion 811B, in turn the radiofrequency communication board 811, and establish electrical connection between the slot antenna and the radiofrequency communication circuit 811A. To secure the connection, another securing mechanism can be provided on the other side of the radiofrequency communication board. As illustrated in FIG. 8, the other side of the radiofrequency communication board may rest on a step portion 816 formed on the housing 812. In a preferred embodiment, the other side of the board is secured and pressed to the housing 812 via a screw 814. The screw can be replaced by an alternative securing element, such as a clipping mechanism or even adhesive.

The lighting arrangement 820 comprises a light emitting element 822, e.g., a set of one or more LEDs. The lighting arrangement 820 may comprise additional lighting circuitry 821, e.g., a driving unit, a control unit and so on. The additional lighting circuitry may, for instance, be communicatively coupled (e.g., via one or more wires as shown) to the radiofrequency communication circuit 811A carried by the radiofrequency communication board 811. The light emitting element 822 and the additional lighting circuitry 821 are placed on a board 824. In an alternative solution, the light emitting element 822 and the additional lighting circuitry 821 can be placed on the radiofrequency communication board.

The lighting element 822 is thermally coupled to the main body 815A of the metal plate 815, via a mechanical and thermal engagement between the board 824 and the metal plate 815. In this way, the main body 815A acts as a heat sink to thermally dissipate heat generated by the lighting element 822. Of course, the remainder of the metal plate 815 may also dissipate heat, as it will also be thermally coupled to the lighting element 822.

For the sake of simplicity, the term "radiofrequency connection portion" can be replaced with the term "connection portion" or "connection element".

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. A radiofrequency communication arrangement comprising:

a radiofrequency communication board carrying a radiofrequency communication circuit and a pair of first radiofrequency connection portions connected with said radiofrequency communication circuit; and a metal plate comprising:

a main body of metal;

a slot antenna formed in the main body;

a pair of second radiofrequency connection portions integrally with the main body and positioned at opposing sides of and connected with the slot antenna, the second radiofrequency connection portion being configured to mechanically engage and position and electrically connect to a respective one of the first radiofrequency connection portions to thereby mechanically engage to the radiofrequency communication board and electrically connect the slot antenna to the radiofrequency communication circuit, wherein the first radiofrequency connection portions comprises a protection as a projected structure and the second radiofrequency connection portions comprises a hook structure adapted to clamp the protection between the hook structure and the main body of the metal plate; or the second radiofrequency connection portion comprises an aperture in the main body of the metal plate and a wall of the aperture as a projected structure; and the first radiofrequency connection portion comprises a hooking or clipping element, as a hook structure, configured to clamp the wall of the aperture to mechanically and electrically engage the radiofrequency communication circuit to the metal plate.

2. The radiofrequency communication arrangement of claim 1, wherein comprises the hook structure is a protruding structure that protrudes from the main body to mechanically engage to the radiofrequency communication board.

3. The radiofrequency communication arrangement of claim 2, wherein:

the radiofrequency communication arrangement comprises a metal housing that houses the radiofrequency communication board;

the metal plate forms part of the metal housing; and the protruding structure protrudes towards an interior of the metal housing.

4. The radiofrequency communication arrangement of claim 2, wherein the protruding structure comprises a stamped protruding structure.

5. The radiofrequency communication arrangement of claim 2, wherein the protruding structure is configured to, besides clamping the projected structure of the first radiofrequency connection portion, apply a spring or elastic force towards the main body of the metal plate and towards the radiofrequency communication board.

6. The radiofrequency communication arrangement of claim 1, wherein the radiofrequency communication board is adapted to be placed horizontally with respect to the metal plate, the hook structure and the main body of the metal plate form an opening facing perpendicularly upward therebetween, and the projection projects substantially perpendicularly from the radiofrequency communication board, faces downward and fits into the opening.

7. The radiofrequency communication arrangement of claim 1, wherein the radiofrequency communication board is adapted to be placed horizontally with respect to the metal plate, and the hooking or clipping element is arc-shape inserting in the aperture and an opening of the arc-shape is facing downward and clamping the wall of the aperture at the bottom of the aperture.

8. The radiofrequency communication arrangement of claim 1, wherein the second radiofrequency connection portion is positioned at a location along the slot antenna and away from a first end of the slot antenna by around a quarter of the longitudinal length of the slot antenna.

9. The radiofrequency communication arrangement of claim 1, wherein the main body of the metal plate is a heat sink.

10. A lighting arrangement comprising:

the radiofrequency communication arrangement of claim 9; and a lighting element configured to emit light, one or more characteristics of the emitted light being responsive to radiofrequency communications received by the radiofrequency communication arrangement via the slot antenna;

wherein said heat sink is thermally coupled to the lighting element.

* * * * *